US009213453B2

(12) United States Patent
Izumi (10) Patent No.: US 9,213,453 B2
(45) Date of Patent: Dec. 15, 2015

(54) CAPACITANCE-TYPE DETECTING DEVICE (75) Inventor: Hiroshi Izumi, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 146 days.

(21) Appl. No.: 13/547,706

(22) Filed: Jul. 12, 2012

(65) Prior Publication Data

US 2013/0015865 A1    Jan. 17, 2013

(30) Foreign Application Priority Data

Jul. 13, 2011  (JP) ................. 2011-154955

(51) Int. Cl.
*G01R 27/26* (2006.01)
*G06F 3/041* (2006.01)
*G06F 3/045* (2006.01)
*G06F 3/044* (2006.01)

(52) U.S. Cl.
CPC ...... *G06F 3/044* (2013.01); *G06F 2203/04103* (2013.01); *G06F 2203/04107* (2013.01); *G06F 2203/04111* (2013.01)

(58) Field of Classification Search
CPC .......... G06F 3/044; G06F 2203/04107; G06F 2203/04103; G06F 2203/04111
USPC .............. 324/658–690; 345/173, 174; 702/52
See application file for complete search history.

(56) References Cited

U.S. PATENT DOCUMENTS

| 4,550,221 | A  | * | 10/1985 | Mabusth ................... 178/18.06 |
| 2006/0049834 | A1 | * | 3/2006 | Umeda ......................... 324/658 |
| 2006/0097991 | A1 | * | 5/2006 | Hotelling ............ G06F 3/0416 345/173 |
| 2009/0102813 | A1 | * | 4/2009 | Mamba et al. ................ 345/174 |

* cited by examiner

Primary Examiner — Melissa Koval
Assistant Examiner — Farhana Hoque
(74) Attorney, Agent, or Firm — Brinks Gilson & Lione (57) ABSTRACT

A capacitance-type detecting device according to an embodiment of the invention includes a plurality of detecting electrodes that are provided on a sensor substrate such that capacitance is formed between adjacent electrodes. Capacitance formed in a corner detection region in which the detection sensitivity of the sensor substrate is relatively low is more than that formed in a central detection region in which the detection sensitivity is relatively high.

4 Claims, 5 Drawing Sheets

SMALL ←——— LENGTH OF OUTER CIRCUMFERENCE ———→ LARGE

CAPACITANCE-TYPE DETECTING DEVICE

CLAIM OF PRIORITY

This application claims benefit of Japanese Patent Application No. 2011-154955 filed on Jul. 13, 2011, which is hereby incorporated by reference in its entirety.

BACKGROUND

1. Field of the Disclosure

The present disclosure relates to a capacitance-type detecting device that detects an object to be detected using a capacitance variation, and more particularly, to a capacitance-type detecting device that detects the coordinates of an object to be detected in a detection target region.

2. Description of the Related Art

Capacitance-type touch panels have been proposed as input devices of various apparatuses (for example, see U.S. Pat. No. 4,550,221). The touch panel includes a plurality of detecting electrodes, which are provided in a houndstooth pattern on a sensor substrate such that a capacitance is formed between adjacent electrodes. The detecting electrodes have a substantially rhombic shape in a plan view and include X-axis electrodes, which are connected in series to each other in the X-axis direction in the sensor surface, and Y-axis electrodes, which are connected in series to each other in the Y-axis direction perpendicular to the X-axis direction in the sensor surface. When the operator presses any position of the sensor surface on a touch panel with the finger, some of the electric field lines formed between a plurality of detecting electrodes are drawn out by the finger and the capacitance formed between the detecting electrodes is reduced. Signals are output from the X-axis electrodes and the Y-axis electrodes according to a variation in the capacitance between the detecting electrodes and are sequentially detected from one end to the other end in the X-axis direction and the Y-axis direction, thereby detecting the touch position of the finger of the operator in the sensor surface.

However, in the capacitance-type touch panel according to the related art, since the plurality of detecting electrodes with the same shape are arranged on the sensor substrate, the capacitance between the detecting electrodes formed at the edge of the sensor substrate is less than that between the detecting electrodes formed at the center of the sensor substrate. Therefore, a capacitance variation when the finger of the operator presses the edge of the sensor substrate is less than that when the finger of the operator presses the center of the sensor substrate, and detection sensitivity at the edge of the sensor substrate is less than that at the center of the sensor substrate.

Therefore, in the capacitance-type touch panel according to the related art, when the touch panel is designed using the capacitance variation at the center of the sensor substrate as a reference, it is difficult to accurately detect the finger of the operator which touches the edge of the sensor substrate. On the other hand, when a predetermined threshold value is set using the capacitance variation at the edge of the sensor substrate as a reference, a detection error (the object to be detected is detected in a state in which the object to be detected does not touch the sensor surface) occurs in the center of the sensor substrate. In particular, when multi-point detection is performed to detect all of a plurality of objects to be detected, it is difficult to accurately detect both an object to be detected which approaches the edge of the sensor substrate and an object to be detected which approaches the center of the sensor substrate.

SUMMARY OF THE INVENTION

A capacitance-type detecting device includes a plurality of detecting electrodes that are provided in a detection target region such that capacitance is formed between adjacent electrodes. Capacitance formed in a low sensitivity region in which detection sensitivity of the detection target region is relatively low is more than capacitance formed in a high sensitivity region in which the detection sensitivity is relatively high.

According to this structure, the difference between a capacitance variation when an object to be detected approaches the low sensitivity region and a capacitance variation when the object to be detected approaches the high sensitivity region is reduced. Therefore, the difference between the detection sensitivity of the object to be detected in the low sensitivity region and the detection sensitivity of the object to be detected in the high sensitivity region is reduced and it is possible to reduce the difference in the detection sensitivity in the detection target region. In addition, even when a plurality of objects to be detected approach the low sensitivity region and the high sensitivity region in the detection target region, it is possible to detect the objects to be detected in the low sensitivity region and the high sensitivity region and thus achieve multi-point detection with high accuracy.

DESCRIPTION OF THE EXEMPLARY EMBODIMENTS

It is noted that, in a capacitance-type detecting device which detected an object to be detected using a variation in the capacitance formed between a plurality of detecting electrodes, the detection sensitivity of the object to be detected in a detection target region was changed depending on the variation in the capacitance formed between a plurality of detecting electrodes in the detection target region. The inventors found that the magnitude of the capacitance formed in the detection target region was changed depending on the detection sensitivity of the object to be detected in the detection target region to reduce the variation in the capacitance when the object to be detected approached the detection region, thereby achieving the invention.

Hereinafter, an embodiment of the invention will be described in detail with reference to the accompanying drawings.

Figure 1:
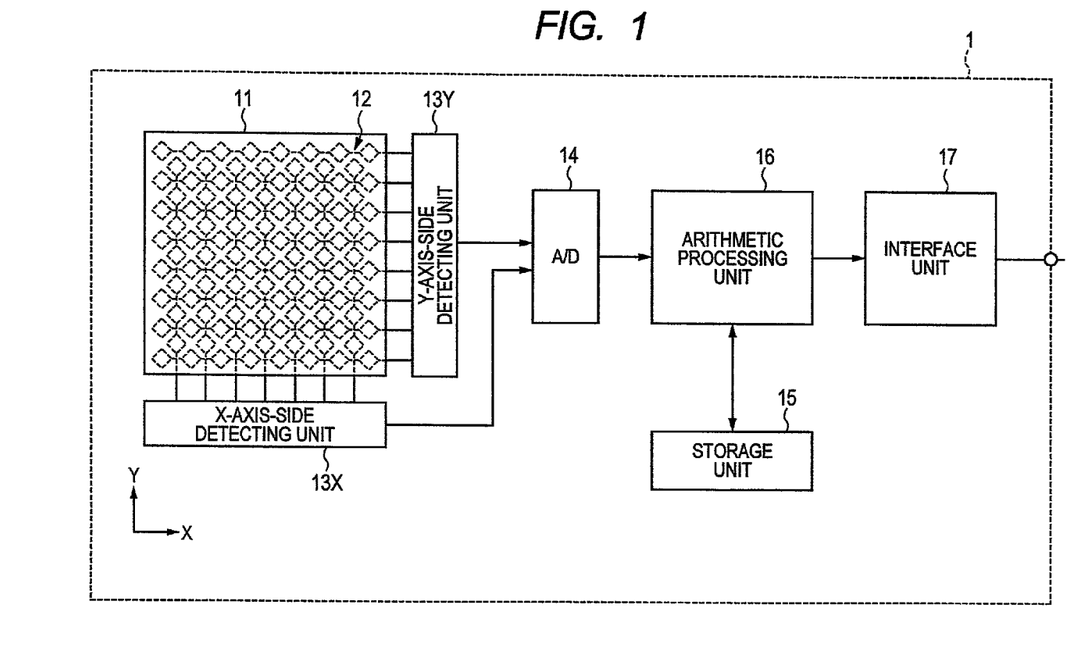
FIG. 1 is a diagram illustrating the structure of a capacitance-type detecting device according to an embodiment.

FIG. 1 is a diagram illustrating the structure of a capacitance-type detecting device according to this embodiment. As shown in FIG. 1, a capacitance-type detecting device 1 according to this embodiment includes a sensor substrate 11, which has a substantially rectangular shape in a plan view and a plurality of detecting electrodes 12 which are provided on the sensor substrate 11, which is a detection target region, such that capacitance is formed between adjacent electrodes. The plurality of detecting electrodes 12 are provided such that capacitance formed in a low sensitivity region in which the detection sensitivity of the sensor substrate 11 is relatively low is more than that formed in a high sensitivity region in which the detection sensitivity is relatively high. In addition, the plurality of detecting electrodes 12 are provided such that capacitance formed at the edge of the sensor substrate 11 is more than that formed at the center of the sensor substrate 11.

Figure 2:
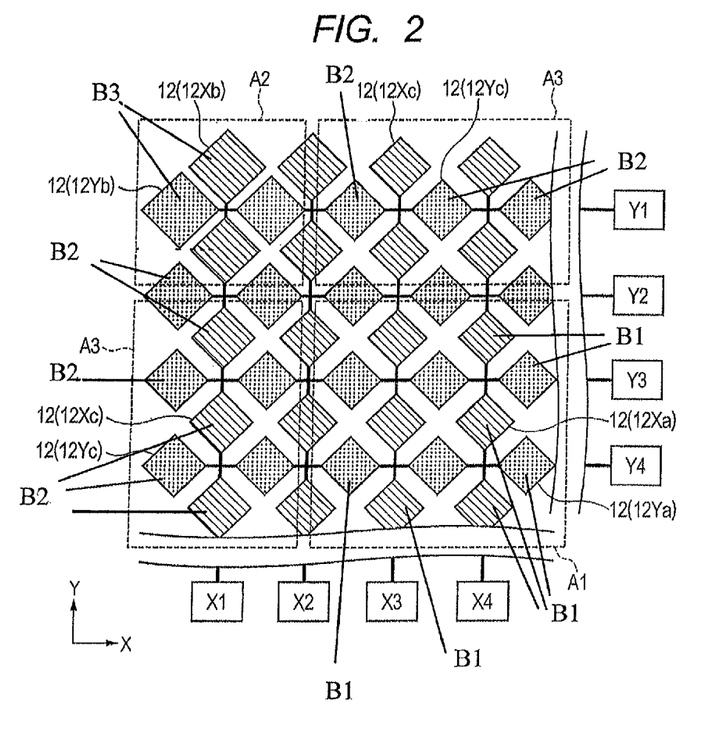
FIG. 2 is a diagram illustrating the arrangement of detecting electrodes in the capacitance-type detecting device according to this embodiment.

FIG. 2 is a plan view schematically the arrangement of the detecting electrodes 12. FIG. 2 is an enlarged view illustrating the corner of the sensor substrate 11. As shown in FIG. 2, the plurality of detecting electrodes 12 have a substantially rhombic shape (a substantially diamond shape) in a plan view and are arranged in a houndstooth shape on the sensor substrate 11. In addition, among the plurality of detecting electrodes 12, one of a pair of diagonal lines is arranged in the X-axis direction and the other diagonal line is arranged in the Y-axis direction. The plurality of detecting electrodes 12 include a plurality of X-axis electrodes 12X which are connected in series to the detecting electrodes 12 adjacent to each other in the X-axis direction and form X-axis electrode columns X1 to X4 and a plurality of Y-axis electrodes 12Y which are connected in series to the detecting electrodes 12 adjacent to each other in the Y-axis direction and form Y-axis electrode rows Y1 to Y4. The X-axis electrode columns X1 to X4 are connected to an X-axis-side detecting unit 13X (see FIG. 1) and the Y-axis electrode rows Y1 to Y4 are connected to a Y-axis-side detecting unit 13Y (see FIG. 1).

The plurality of detecting electrodes 12 are arranged such that the capacitance between the detecting electrodes 12 formed at the edge (side and corner) of the sensor substrate 11 is more than that between the detecting electrodes 12 formed at the center of the sensor substrate 11. In addition, the plurality of detecting electrodes 12 are arranged such that capacitance formed at both ends in the X-axis direction and capacitance formed at both ends in the Y-axis direction are more than that formed at the center in the X-axis direction and the Y-axis direction. In this embodiment, the area of the detecting electrode 12 arranged at the edge of the sensor substrate 11, which is a detection target region, is more than that of the detecting electrode 12 arranged at the center of the sensor substrate 11. In this way, the capacitance between the detecting electrodes 12 formed at the edge of the sensor substrate 11 is more than that formed between the detecting electrodes 12 formed at the center of the sensor substrate 11. Therefore, the difference between a capacitance variation when the object to be detected approaches the edge of the sensor substrate 11 and a capacitance variation when the object to be detected approaches the center of the sensor substrate 11 is reduced. As a result, it is possible to reduce a difference in detection sensitivity in the sensor substrate 11.

In this embodiment, as represented by a dotted line in FIG. 2, the sensor substrate 11, which is a detection target region, is divided into a central detection region A1 which is provided at the center of the sensor substrate 11 and is a high sensitivity region with a relatively high detection sensitivity, corner detection regions A2 which are provided at the corners of the sensor substrate 11 and are low sensitivity regions with a relatively low detection sensitivity, and side detection regions A3 which are provided at both ends of the sensor substrate 11 in the X-axis direction and the Y-axis direction and are intermediate sensitivity regions. At least one of the detecting electrodes 12 (an X-axis electrode 12Xb and a Y-axis electrode 12Yb) provided in the corner detection region A2, which is the low sensitivity region, has an area/size B3 that is greater than an area/size B1 of the detecting electrodes 12 (an X-axis electrode 12Xa and a Y-axis electrode 12Ya) provided in the central detection region A1, which is the high sensitivity region. In addition, the plurality of detecting electrodes 12 are arranged such that at least one of the detecting electrodes 12 (an X-axis electrode 12Xc and a Y-axis electrode 12Yc) provided in the side detection region A3, which is the intermediate sensitivity region, has an area/size B2 between the area/size B3 of the detecting electrodes 12 (the X-axis electrode 12Xb and the Y-axis electrode 12Yb) provided in the corner detection region A2 and the area/size B1 of the detecting electrodes 12 (the X-axis electrode 12Xa and the Y-axis electrode 12Ya) provided in the central detection region A1.

According to this structure, the capacitance formed in the corner detection region A2 is more than that formed in the central detection region A1. In addition, the capacitance formed in the side detection region A3 is between the capacitance formed in the central detection region A1 and the capacitance formed in the corner detection region A2. In this way, the difference among a capacitance variation when the finger of the operator, which is an object to be detected, approaches the central detection region A1 of the sensor substrate 11, a capacitance variation when the finger approaches the corner detection region A2, and a capacitance variation when the finger approaches the side detection region A3 is reduced. As a result, it is possible to reduce the difference between the detection sensitivity of the object to be detected in the corner detection region A2 and the side detection region A3 provided at the edge of the sensor substrate 11 and the detection sensitivity of the object to be detected in the central detection region A1 provided at the center of the sensor substrate 11.

In the example shown in FIG. 2, the sensor substrate 11 is divided into three detection regions A1 to A3 and the magnitude of the capacitance formed in each of the detection regions A1 to A3 is changed depending on detection sensitivity. However, the area of the electrode may be changed for each of the X-axis electrode columns X1 to X4 and the Y-axis electrode rows Y1 to Y4 arranged on the sensor substrate 11. In this case, as shown in FIG. 2, the area of the Y-axis electrodes 12Y belonging to the Y-axis electrode rows Y1 and Y2 provided at one side of the sensor substrate 11 in the X-axis direction is greater than that of the Y-axis electrodes 12Y belonging to the Y-axis electrode rows Y3 and Y4 provided at the center of the sensor substrate 11 in the X-axis direction. In this way, similarly to the above-mentioned example, it is possible to reduce a difference in detection sensitivity in the surface of the sensor substrate 11. In addition, the area of the X-axis electrodes 12X belonging to the X-axis electrode columns X1 and X2 provided at one side of the sensor substrate 11 in the Y-axis direction is greater than that of the X-axis electrodes 12X belonging to the X-axis electrode columns X3 and X4 provided at the center of the sensor substrate 11 in the Y-axis direction. In this way, it is possible to reduce a difference in detection sensitivity in the surface of the sensor substrate 11. In this case, in particular, the area of the X-axis electrode 12X and the Y-axis electrode 12Y provided at the corner (in a region including the X-axis electrode columns X1 and X2 and the Y-axis electrode rows Y1 and Y2) of the sensor substrate 11 increases to reduce a difference in detection sensitivity in the detection target region. In this embodiment, the corner detection region A2, which is the low sensitivity region, and the side detection region A3, which is the intermediate sensitivity region, are provided at the edge of the surface of the sensor substrate 11 and the area of the detecting electrodes 12 (the X-axis electrodes 12Xb and 12Xc and the Y-axis electrodes 12Yb and 12Yc) provided at the edge is in the range of 101% to 150% of the area of the detecting electrodes 12 (the X-axis electrode 12Xa and the Y-axis electrode 12Ya) provided in the central detection region A1 which is the high sensitivity region and is provided at the center of the sensor substrate 11. In this way, it is possible to reduce a difference in detection sensitivity in the surface of the sensor substrate 11.

The areas of the plurality of detecting electrodes 12 may not be necessarily different from each other. The plurality of detecting electrodes 12 may be arranged in any way as long as the magnitude of the capacitance formed in the detection target region can be adjusted according to the detection sensitivity of the object to be detected. For example, it is possible to increase the capacitance between the detecting electrodes 12 by increasing the length of the outer circumference of the detecting electrode 12, reducing the distance between the detecting electrodes 12, or increasing the density (occupancy) of the detecting electrodes 12 in the sensor substrate 11. In addition, the detecting electrodes 12 may be made of a material with low conductivity to increase the magnitude of the capacitance between the detecting electrodes 12.

As shown in FIG. 1, the capacitance-type detecting device 1 includes the X-axis-side detecting unit 13X that detects a capacitance variation in the X-axis direction in the surface of the sensor substrate 11, the Y-axis-side detecting unit 13Y that detects a capacitance variation in the Y-axis direction perpendicular to the X-axis direction in the surface of the sensor substrate 11, an A/D conversion unit 14 that converts analog output signals from the X-axis-side detecting unit 13X and the Y-axis-side detecting unit 13Y into digital signals, a storage unit 15 that stores, for example, the capacitance variations in the X-axis direction and the Y-axis direction, an arithmetic processing unit 16 that performs an arithmetic process using, for example, the detected capacitance variation, and an interface unit 17 that outputs the position of the object to be detected which is calculated by the arithmetic processing unit 16.

The X-axis-side detecting unit 13X that sequentially detects a variation in the capacitance of the X-axis electrodes 12X belonging to each of the X-axis electrode columns X1 to X4 from one end (X1 in FIG. 2) to the other end (X4 in FIG. 2) in the X-axis direction. In addition, the X-axis-side detecting unit 13X may sequentially detect the variation in the capacitance of the X-axis electrodes 12X, but the detection order is not particularly limited. The X-axis-side detecting unit 13X may detect the variation in the capacitance of the X-axis electrodes 12X belonging to each of the X-axis electrode columns X1 to X4 in any order.

The Y-axis-side detecting unit 13Y sequentially detects a variation in the capacitance of the Y-axis electrodes 12Y belonging to each of the Y-axis electrode rows Y1 to Y4 from one end (Y1 in FIG. 2) to the other end (Y4 in FIG. 2) in the Y-axis direction. In addition, the Y-axis-side detecting unit 13Y may sequentially detect the variation in the capacitance of the Y-axis electrodes 12Y, but the detection order is not particularly limited. The Y-axis-side detecting unit 13Y may detect the variation in the capacitance of the Y-axis electrodes 12Y belonging to each of the X-axis electrode rows Y1 to Y4 in any order.

Here, the X-axis-side detecting unit 13X and the Y-axis-side detecting unit 13Y directly detect the variation in the capacitance between the detecting electrodes 12. However, this embodiment is not limited thereto. For example, another circuit, such as the arithmetic processing unit 16, may compare the capacitance values obtained by the X-axis-side detecting unit 13X and the Y-axis-side detecting unit 13Y with a reference capacitance value and calculate a capacitance variation on the basis of the comparison result.

The A/D (analog/digital) conversion unit 14 converts a detection signal (data related to the variation in the capacitance of the X-axis electrode 12X) of the X-axis-side detecting unit 13X and a detection signal (data related to the variation in the capacitance of the Y-axis electrode 12Y) of the Y-axis-side detecting unit 13Y into digital signals and supplies the digital signals to the storage unit 15 and the arithmetic processing unit 16.

The storage unit 15 includes a storage region for storing the detected variation in the capacitance of the electrode. When the variation in the capacitance of the X-axis electrodes 12X is detected, the storage unit 15 may store a variation in the capacitance of all of the X-axis electrodes 12X belonging to the X-axis electrode columns X1 to X4 in the storage region at the same time, or it may selectively store a variation in the capacitance of some of the X-axis electrodes 12X (at least two adjacent X-axis electrodes 12X).

Data detected by the X-axis-side detecting unit 13X and the Y-axis-side detecting unit 13Y may be supplied to the storage unit 15 through the arithmetic processing unit 16 or it may be directly supplied from the X-axis-side detecting unit 13X and the Y-axis-side detecting unit 13Y to the storage unit 15 through the A/D conversion unit 14.

The arithmetic processing unit 16 performs an arithmetic process using the detected variation in the capacitance of the electrodes, thereby determining the number of regions or a coordinate region which is touched by the object to be detected. The arithmetic processing unit 16 compares the variation in the capacitance of a predetermined X-axis electrode 12X detected by the X-axis-side detecting unit 13X with a variation in the capacitance of the X-axis electrode 12X adjacent to the predetermined X-axis electrode 12X (calculates the difference between the variations) and determines a start electrode and an end electrode which define the coordinate region of a detection target on the basis of the comparison value and the detected variation in the capacitance of the X-axis electrode 12X.

Figure 3A:
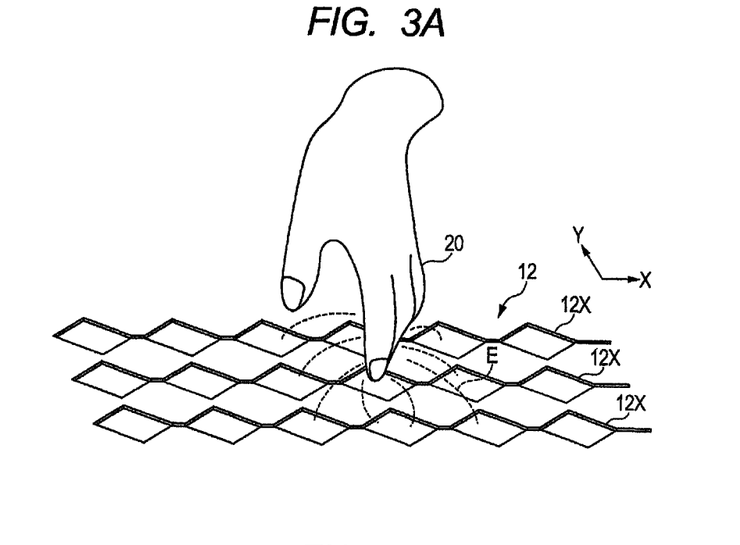
FIGS. 3A and 3B are conceptual diagrams illustrating the detection principle of the capacitance-type detecting device according to this embodiment.
Figure 3B:
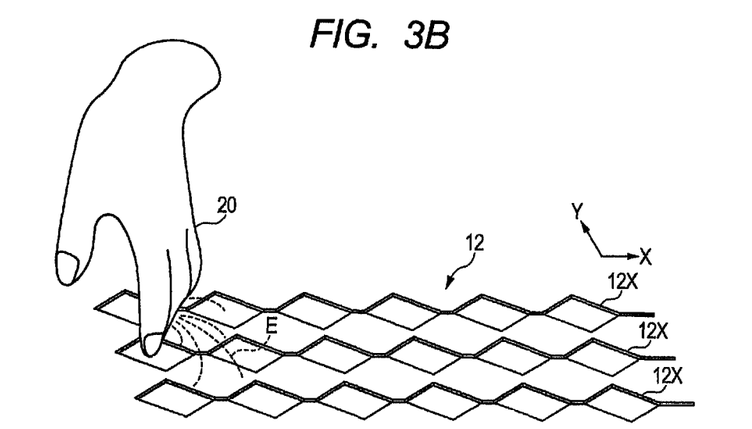

Next, the measurement principle of the capacitance-type detecting device 1 will be described. FIGS. 3A and 3B are diagrams schematically illustrating the measurement principle of the capacitance-type detecting device 1 and schematically show the finger 20 of the operator which is an object to be detected and approaches the sensor substrate 11. When the finger 20 of the operator, which is an object to be detected, is not approached, a constant capacitance is formed between the detecting electrodes 12 arranged on the sensor substrate 11.

As shown in FIG. 3A, when the finger 20 of the operator approaches the center of the sensor substrate 11, electric field lines E formed between one detecting electrode 12 which is arranged at the center and all of the detecting electrodes 12 (in the example shown in FIG. 3A, eight detecting electrodes 12) which are adjacent to the detecting electrode 12 are drawn out by the finger 20 of the operator and capacitance is reduced.

On the other hand, as shown in FIG. 3B, when the finger 20 of the operator touches the side of the sensor substrate 11, the electric field lines E formed between one detecting electrode 12 which is arranged on the side and the detecting electrodes 12 (in the example shown in FIG. 3B, five detecting electrodes 12) which are adjacent to the detecting electrode 12 are drawn out by the finger 20 of the operator and capacitance is reduced. Therefore, a capacitance variation when the finger 20 approaches the side of the sensor substrate 11 is less than that when the finger 20 approaches the center of the sensor substrate 11.

Figure 4:
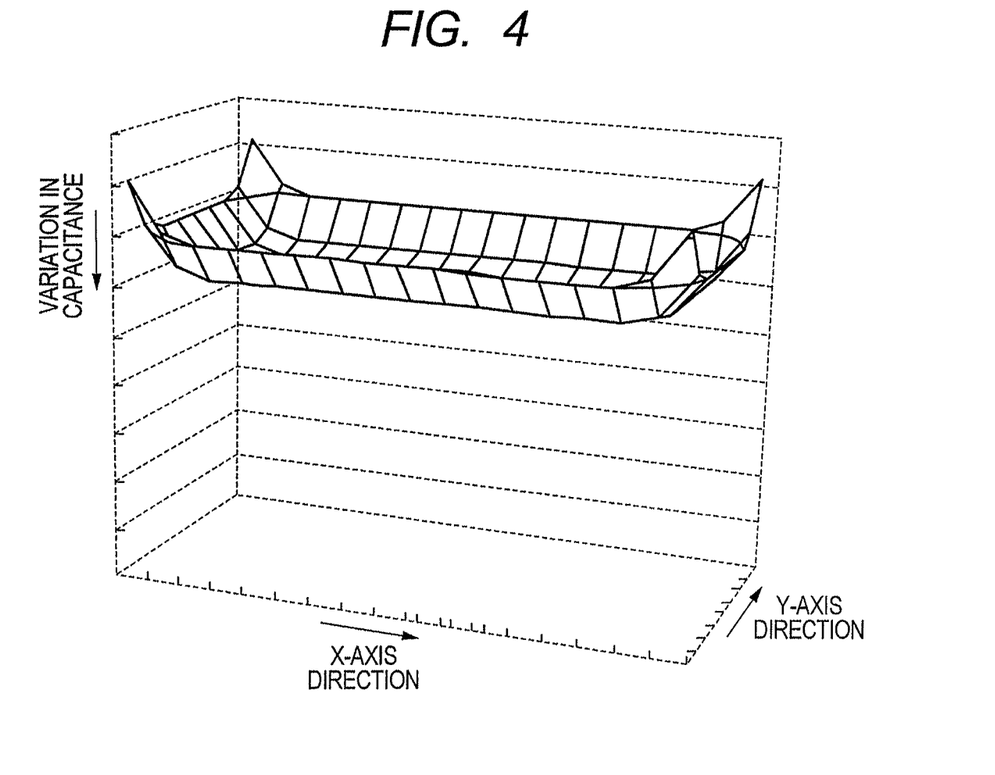
FIG. 4 is a conceptual diagram illustrating a capacitance variation in the capacitance-type detecting device.

FIG. 4 is a conceptual diagram illustrating a capacitance variation in the surface of the sensor substrate 11, which is a detection target region. FIG. 4 shows a capacitance variation when a plurality of detecting electrodes 12 have the same shape and the finger 20 of the operator approaches the sensor substrate 11. As shown in FIG. 4, when the detecting electrodes 12 have the same shape, the capacitance variation is reduced as the finger 20 approaches the edge of the sensor substrate 11. In addition, as the finger 20 approaches the sensor substrate 11 from one side to the corner, the capacitance variation is reduced. As such, when all of the detecting electrodes 12 provided on the sensor substrate 11 have the same shape, the capacitance variation when the finger 20 of the operator approaches the side and corner of the sensor substrate 11 is less than that when the finger 20 of the operator approaches the center of the sensor substrate 11. As a result, the intensity of the output signals from the X-axis electrodes 12X and the Y-axis electrodes 12Y provided at the side and corner of the sensor substrate 11 is less than that of the output signals from the X-axis electrodes 12X and the Y-axis electrodes 12Y provided at the center of the sensor substrate 11, and detection sensitivity at the side and corner of the sensor substrate 11 is reduced. Therefore, in the capacitance-type detecting device 1 according to this embodiment, the capacitance formed at the edge of the sensor substrate 11 is adjusted so as to be more than that formed at the center of the sensor substrate 11. In this way, a capacitance variation when the finger 20 of the operator approaches the corner detection region A2 and the side detection region A3 of the sensor substrate 11 is more than that when the finger 20 of the operator approaches the central detection region A1. As a result, the difference between the detection sensitivity of the finger 20 of the operator in the corner detection region A2 and the side detection region A3 of the sensor substrate 11 and the detection sensitivity of the finger 20 of the operator in the central detection region A1 is reduced. Therefore, it is possible to reduce the difference in the detection sensitivity in the entire sensor substrate 11.

The capacitance-type detecting device 1 according to this embodiment detects a capacitance variation when an object to be detected, such as the finger 20 of the operator, approaches the operation surface of, for example, a glass substrate (not shown) which is provided on the sensor substrate 11 and specifies a touch position. The capacitance-type detecting device 1 according to this embodiment uses the capacitance value of the electrode when the object to be detected does not touch the sensor surface as a reference value and detects a capacitance variation when the object to be detected touches the sensor surface from the capacitance value, which is the reference value. Examples of the capacitance types include a self-capacitance detection type which detects self-capacitance formed between the electrode and the ground (GND), a mutual capacitance detection type which detects mutual capacitance formed between two electrodes, and a differential mutual capacitance detection type which detects capacitance defined as the difference between the mutual capacitances between a reference electrode and two sensor electrodes. The capacitance-type detecting device 1 may be any type thereof. In the self-capacitance detection type, the capacitance of a touched portion increases (is changed in the positive direction). In the mutual capacitance detection type, the capacitance of a touched portion decreases (is changed in the negative direction). FIG. 2 shows the detection of capacitance by the mutual capacitance detection type.

Figure 5:
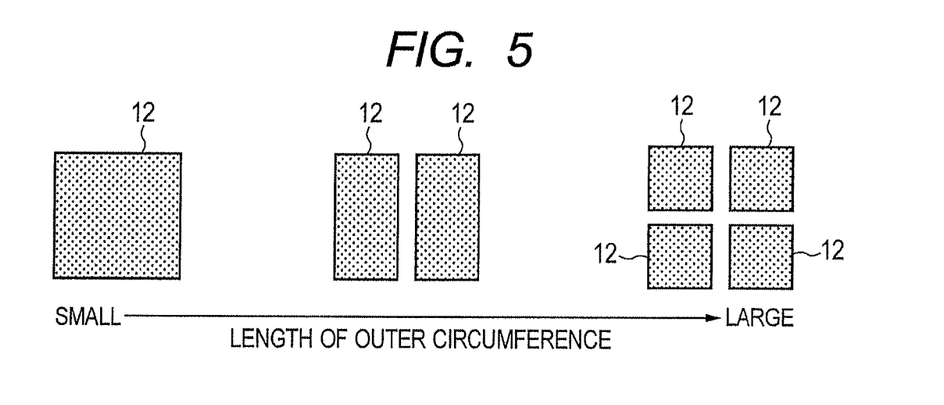
FIG. 5 is a schematic plan view illustrating the relationship between the shape of the detecting electrode and the length of the outer circumference thereof.

Next, an example in which the length (the length of the end surface) of the outer circumference of the detecting electrode 12 is changed without changing the total area of the detecting electrodes 12 will be described. FIG. 5 is a schematic plan view illustrating the relationship between the shape of the detecting electrode 12 and the length of the outer circumference thereof. FIG. 5 shows an example in which one detecting electrode 12 having a substantially rectangular shape in a plan view is used, an example in which the detecting electrode 12 is divided into two detecting electrodes 12, and an example in which the detecting electrode 12 is divided into four detecting electrodes 12. In these examples, as the length of the outer circumference of the detecting electrode 12 increases (that is, in order of when the detecting electrode 12 is not divided, when the detecting electrode 12 is divided into two detecting electrodes, and when the detecting electrode 12 is divided into four detecting electrodes), the capacitance formed between the detecting electrodes 12 increases. Therefore, for example, when the detecting electrodes 12 with substantially the same area are patterned on the sensor substrate 11, each of the detecting electrodes 12 in the side detection regions A3 provided at both sides in the X-axis direction and the Y-axis direction is divided into two parts, and each of the detecting electrodes 12 in the corner detection regions A2 is divided into four parts, the length of the outer circumference of the detecting electrodes 12 at the edge of the sensor substrate 11, which is a detection target region, can be more than the length of the outer circumference of the detecting electrodes 12 provided at the center of the sensor substrate 11. According to this structure, since the capacitance formed at the edge of the sensor substrate 11 is greater than that formed at the center of the sensor substrate 11, the difference between a capacitance variation when the object to be detected approaches the edge of the sensor substrate 11 and a capacitance variation when the object to be detected approaches the center of the sensor substrate 11 is reduced. As a result, the difference between the detection sensitivity of the object to be detected at the edge of the detection target region and the detection sensitivity of the object to be detected at the center of the detection target region is reduced. Therefore, it is possible to reduce a difference in detection sensitivity in the detection target region.

In the above-described embodiment, the capacitance formed between the detecting electrodes 12 is adjusted considering a capacitance variation at the edge of the sensor substrate 11 and a capacitance variation at the center of the sensor substrate 11. However, the capacitance formed between the detecting electrodes 12 may be adjusted considering the thickness of a coating material provided on the sensor substrate 11.

Figure 6:
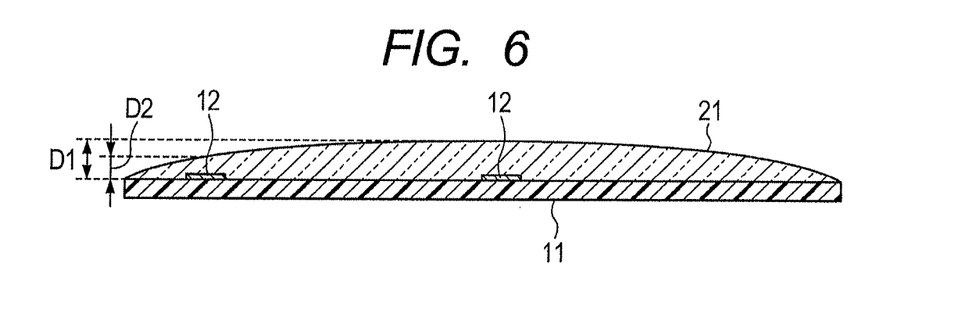
FIG. 6 is a schematic cross-sectional view illustrating an example of a sensor substrate having a coating material provided thereon.

FIG. 6 is a schematic cross-sectional view illustrating an example of the sensor substrate 11 having a coating material provided thereon. A capacitance-type detecting device 1 shown in FIG. 6 includes the sensor substrate 11 on which a plurality of detecting electrodes 12 are provided and an overlay 21 which is a coating material covering the detecting electrodes 12 provided on the sensor substrate 11. The overlay 21 has a substantially dome shape which swells upward from the center of the sensor substrate 11 and is provided such that the thickness D1 of the center of the sensor substrate 11 is greater than the thickness D2 of the edge of the sensor substrate 11. The capacitance-type detecting device 1 shown in FIG. 6 detects an object to be detected through the overlay 21. Therefore, since a capacitance variation when the object to be detected approaches the center of the sensor substrate 11 where the thickness D1 of the overlay 21 is relatively large is less than that when the object to be detected approaches the edge of the sensor substrate 11 where the thickness D2 of the overlay 21 is relatively small, the detection sensitivity of the object to be detected at the center of the sensor substrate 11 is less than the detection sensitivity of the object to be detected at the edge of the sensor substrate 11.

The plurality of detecting electrodes 12 are arranged such that capacitance formed in a region in which the thickness of the overlay 21 is relatively large is less than that formed in a region in which the thickness of the overlay 21 is relatively small. For example, in the example shown in FIG. 6, the thickness D2 of the overlay 21 at the edge of the sensor substrate 11 is less than the thickness D1 of the overlay 21 at the center of the sensor substrate 11. Therefore, the detecting electrodes 12 are arranged such that the capacitance formed between the detecting electrodes 12 provided in a central detection region A1 in which the thickness of the overlay 21 is large and the detection sensitivity of the object to be detected is relatively low is more than the capacitance formed between the detecting electrodes 12 provided in a thin corner detection region A2 and a side detection region A3 in which the thickness of the overlay 21 is small. In this way, the difference between a capacitance variation when the object to be detected approaches the region in which the thickness of the overlay 21 is relatively large and a capacitance variation when the object to be detected approaches the region in which the thickness of the overlay 21 is relatively small is reduced. Therefore, it is possible to reduce a difference in detection sensitivity in a detection target region due to the thickness of the overlay 21 provided on the sensor substrate 11.

In addition, a ground electrode may be formed in a region of the sensor substrate 11 to adjust the capacitance formed in the sensor substrate 11 which is a detection target region.

Figure 7A:
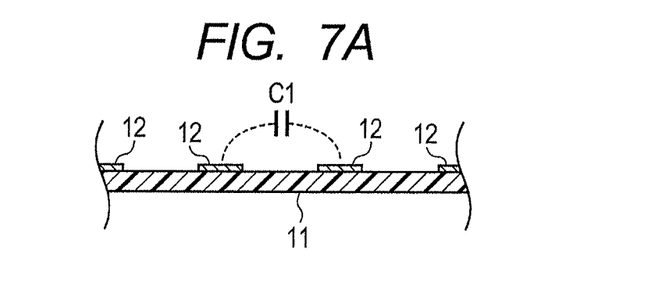
FIGS. 7A and 7B are diagrams illustrating examples of the adjustment of capacitance by a ground electrode.
Figure 7B:
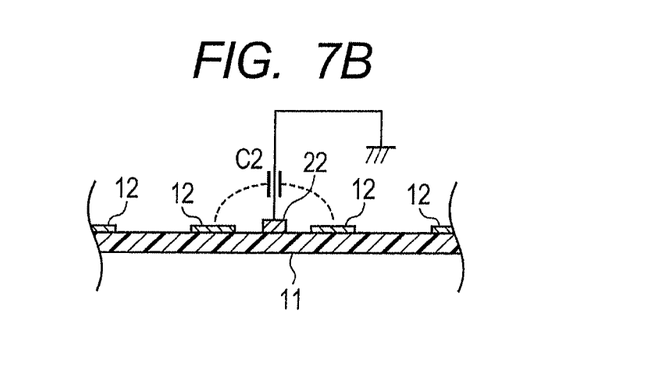

FIGS. 7A and 7B are diagrams illustrating an example of the adjustment of capacitance by the ground electrode. As shown in FIG. 7A, a predetermined capacitance C1 is formed between the detecting electrodes 12 provided on the sensor substrate 11. As shown in FIG. 7B, when a ground electrode 22 is provided in a region of the sensor substrate 11, which is a detection target region, a portion of the capacitance C1 formed between the detecting electrodes 12 is absorbed by the ground electrode 22 and the capacitance C2 is reduced. Therefore, for example, when the ground electrode 22 is provided in the central detection region A1 in which detection sensitivity is relatively high, it is possible to arbitrarily adjust the detection sensitivity in the surface of the sensor substrate 11 and further reduce the difference in detection sensitivity in the surface of the sensor substrate 11. For example, the ground electrode 22 is provided in the central detection region A1, which is a high sensitivity region of the sensor substrate 11, and a portion of the capacitance formed in the central detection region A1 is absorbed by the ground electrode 22. Therefore, it is possible to reduce the difference in detection sensitivity in the sensor substrate 11, which is a detection target region.

As described above, according to the capacitance-type detecting device 1 of the above-described embodiment, since the capacitance formed between the detecting electrodes 12 provided in the low sensitivity region (the corner detection region A2 and the side detection region A3) of the sensor substrate 11 is more than that formed between the detecting electrodes 12 provided in the high sensitivity region (central detection region A1), a capacitance variation when the object to be detected approaches the low sensitivity region is less than that when the object to be detected approaches the high sensitivity region. In this way, the difference between the detection sensitivity of the object to be detected in the low sensitivity region and the detection sensitivity of the object to be detected in the high sensitivity region is reduced. Therefore, it is possible to reduce a difference in detection sensitivity in the detection target region. In addition, even when a plurality of objects to be detected approach the low sensitivity region and the high sensitivity region of the detection target region, it is possible to detect the objects to be detected in the low sensitivity region and the high sensitivity region. Therefore, it is possible to achieve multi-point detection with high accuracy.

The invention is not limited to the above-described embodiment, but various modifications and changes of the invention can be made. In the above-described embodiment, the sizes and shapes of the components are not limited to those shown in the accompanying drawings, but may be appropriately changed within the range in which the effect of the invention is obtained. In addition, various modifications and changes of the invention can be made without departing from the scope and spirit of the invention.

For example, in the above-described embodiment, the detecting electrode has a substantially rhombic shape in a plan view. However, the shape of the detecting electrode is not particularly limited, but may be appropriately changed as long as capacitance is formed between adjacent electrodes. For example, the detecting electrode may have a substantially triangular shape, a substantially rectangular shape, a substantially polygonal shape, a substantially circular shape, or a substantially elliptical shape in a plan view.

The invention can detect the distance between the objects to be detected and detect the touch position of the object to be detected with high accuracy. In particular, the invention can be applied to various input devices, such as operation panels of portable apparatuses, digital photoframes, PCs, and audio systems.

It should be understood by those skilled in the art that various modifications, combinations, sub-combinations and alterations may occur depending on design requirements and other factors insofar as they are within the scope of the appended claims of the equivalents thereof.

What is claimed is:

1. A capacitance-type detecting device comprising:
   a plurality of detecting electrodes that are provided in a detection target region to form capacitance between adjacent detecting electrodes and that detect the capacitance between the adjacent detecting electrodes,
   wherein the plurality of detecting electrodes have varied sizes, and at least one of the detecting electrodes arranged at an edge of the detection target region has a size larger than a size of a detecting electrode arranged at a center of the detection target region, and
   wherein a size of the detecting electrode formed at both ends of the detection target region in an X-axis direction and a size of the detecting electrode formed at both ends in a Y-axis direction perpendicular to the X-axis direction are larger than a size of the detecting electrode formed at a center in the X-axis direction and the Y-axis direction.

2. The capacitance-type detecting device according to claim 1, wherein the detection target region includes a central detection region, a corner detection region, and a side detection region,
   wherein some of the detecting electrodes in the central detection region detect a first capacitance, some of the detecting electrodes in the corner detection region detect a second capacitance, and some of the detecting electrodes in the side detection region detect a third capacitance, and wherein at least two of the first capacitance, the second capacitance and third capacitance are different.

3. The capacitance-type detecting device of claim 2, wherein the first capacitance is smaller than the second capacitance.

4. The capacitance-type detecting device of claim 2, wherein the third capacitance is larger than the first capacitance and smaller than the second capacitance.

\* \* \* \* \*